United States Patent [19]

Baumhauer, Jr. et al.

[11] Patent Number: 4,533,795
[45] Date of Patent: Aug. 6, 1985

[54] INTEGRATED ELECTROACOUSTIC TRANSDUCER

[75] Inventors: John C. Baumhauer, Jr.; Harold J. Hershey, both of Indianapolis, Ind.; Tommy L. Poteat, Bridgewater, N.J.

[73] Assignees: American Telephone and Telegraph, New York, N.Y.; AT&T Bell Laboratories, Murray Hill, N.J.

[21] Appl. No.: 511,640

[22] Filed: Jul. 7, 1983

[51] Int. Cl.³ .............................................. H04R 7/18
[52] U.S. Cl. .................................. 179/111 E; 29/25.35
[58] Field of Search ....................... 179/111 E, 111 R; 29/594, 592 E, 25.35

[56] References Cited

U.S. PATENT DOCUMENTS

| 3,118,022 | 1/1964 | Sessler et al. | 179/111 |
| 4,225,755 | 9/1980 | Block | 179/111 E |
| 4,321,432 | 3/1982 | Matsutani | 179/111 E |

FOREIGN PATENT DOCUMENTS

| 84608 | 10/1982 | European Pat. Off. | 179/111 R |
| 2094098 | 9/1982 | United Kingdom | 179/111 R |

OTHER PUBLICATIONS

"On the Acoustical Resistance Due to Viscous Losses in the Air Gap of Electrostatic Transducers", Z. Skvor, Acustica, vol. 19, pp. 295-299, (1967/1968).

"Optimization of a Ridge Backplate for Electret Microphones", H. S. Madsen, Journal of the Acoustical Society of America, vol. 53, No. 6, pp. 1616-1619, (1973).

Primary Examiner—Gene Z. Rubinson
Assistant Examiner—L. C. Schroeder
Attorney, Agent, or Firm—Lester H. Birnbaum

[57] ABSTRACT

An electroacoustic transducer, primarily in the form of a capacitive microphone, for incorporation into a semiconductor substrate. The vibrating element comprises a largely nontensioned diaphragm, such as an epitaxial layer formed on the semiconductor substrate, so as to greatly reduce its mechanical stiffness. The substrate is etched away in the desired area to define the diaphragm and form an acoustic cavity. A continuous array of microscopic holes is formed in the backplate to cut down the lateral flow of air in the gap between capacitor electrodes. Narrow gaps made possible by the hole array allow low voltage diaphragm biasing. In at least one embodiment, the acoustic input can be provided through the air hole array. An acoustic port may be added to alter the frequency response of the device, and a back closure provided to act as a rear acoustic cavity and an EMI shield.

26 Claims, 6 Drawing Figures

INTEGRATED ELECTROACOUSTIC TRANSDUCER

BACKGROUND OF THE INVENTION

This invention relates to electroacoustic transducers, such as microphones, and in particular to a structure which is incorporated into a semiconductor substrate.

Demand is growing for electroacoustic transducers which may be formed as part of a semiconductor integrated circuit. These transducers may include, for example, microphones incorporated into the circuitry of telecommunications and audio recording equipment, hearing aid microphones and receivers, or miniature speakers. In the case of microphones, electrostatic device technology presently in widespread use generally takes the form of a metalized polymeric foil (which may be charged) supported over a metalized backplate or stationary structure so as to form a variable capacitor responsive to voiceband frequencies. While adequate, such devices are relatively large, discrete components which cannot be integrated into the semiconductor integrated circuitry with which they are used.

Recently, such an integrated microphone structure and a method of manufacture were proposed. (See U.S. Patent application of I. J. Busch-Vishniac et al., Ser. No. 469,410, filed Feb. 24, 1983 and assigned to Bell Telephone Laboratories, which is incorporated by reference herein.) Briefly, the microphone included a tensioned membrane formed from a thinned portion of a thicker semiconductor substrate. The membrane had an area and thickness such that it vibrated in response to incident sound waves. A pair of electrodes formed a capacitor, with one of the electrodes vibrating with the membrane to vary the capacitance when a biasing voltage was applied and produce an electrical equivalent to the acoustic signal. It has also been suggested that an integrated capacitive microphone can include an insulating layer with fixed charge for providing a built-in diaphragm bias for the device. (See U.S. Patent application of W. S. Lindenberger, T. L. Poteat, and J. E. West, Case 2-2-24, filed on an even date herewith and assigned to Bell Telephone Laboratories.)

While such structures offer considerable promise for the replacement of the distinct microphones now in use, several problems and considerations remain in the commercial realization of an integrated microphone. Foremost, it is desirable to make the area of the vibrating element as small as possible to reduce cost. However, a small area tends to cause a drop in sonic force on the diaphragm element, thereby lowering the sensitivity of the device. Further, smaller area diaphragms produce a smaller device capacitance which in turn tends to increase the noise associated with on-chip circuitry coupled to the device and also tends to further decrease the integrated microphone sensitivity through capacitance divider action. In order to alleviate such effects of reduced area (i.e., reduced signal-to-noise ratio), it is desirable to reduce the stiffness of the diaphragm.

The above-noted effects of reduced diaphragm area may also be compensated for by a reduction in the thickness of the air gap between capacitor electrodes. We have found, however, that for air gaps below approximately 1.5 $\mu$m with other dimensions optimized for certain telephone applications, the electrical output frequency response of a microphone with a tensioned diaphragm had a tendency to fall at an unacceptable rate with frequency when utilizing acoustic venting means, common in commercially available devices, comprising 4-20 holes around the periphery of the stationary electrode and backplate. That is, the devices would be overdamped, even at the critical 300-3,500 Hz portion of the audioband which is transmitted in telephone equipment. Specifically, with an air gap of 0.25 $\mu$m which yielded the optimum signal-to-noise ratio, the response fell more than 20 dB across the telephone frequency band indicating severe overdamping. Sensitivity levels were also inoperably low. It is, therefore, also desirable to provide some acoustic venting means which will permit reduced area and produce an acceptable output signal at telephone band frequencies or other frequency bands of interest.

A reduction in the air gap thickness will also have another beneficial effect, which is to reduce the external dc voltage level needed to bias the diaphragm. This would provide an alternative to the requirement of a built-in diaphragm bias as suggested in the application of Lindenberger, previously cited.

In addition, a silicon integrated microphone will generally have a nonrising output response as a function of frequency in the audio bandwidth. In some applications, it may be desirable to tailor the response to provide a peak at a certain frequency by means of an appropriately shaped acoustic port and coupling cavity. Further, the microphone chip may, under certain circumstances, be subject to high electromagnetic interference (EMI), and so some shielding means may be needed. In the design of an integrated microphone, therefore, it is desirable to provide these functions with a minimum number of piece parts.

It is therefore an object of the invention to provide an integrated electroacoustic transducer with a small diaphragm area which still provides an acceptable frequency response and signal-to-noise ratio. It is a further object of the invention to provide an electroacoustic transducer which can be operated at a low dc bias. It is a still further object of the invention to provide acoustical interconnection and tuning means, and EMI shielding means, for an integrated electroacoustic transducer.

SUMMARY OF THE INVENTION

These and other objects are achieved in accordance with the invention which is an electroacoustic transducer formed within a semiconductor substrate. The transducer comprises a diaphragm which vibrates in response to an input signal at audio and/or ultrasonic frequencies, and a pair of electrodes placed with respect to said diaphragm so that the electric field between the electrodes varies in relation to the vibrating diaphragm to permit conversion between electrical and acoustic signals. In accordance with one aspect of the invention, the diaphragm is essentially nontensioned and has a mechanical bending moment stiffness which allows it to vibrate at audioband and/or ultrasonic frequencies.

In accordance with a further aspect of the invention, the transducer comprises an air gap formed between the electrodes and acoustic venting means comprising a continuous array of small holes extending through one of the electrodes to the air gap, where the array covers essentially the entire area of the electrode co-extensive with the diaphragm.

In accordance with a further aspect of the invention, a front acoustic cavity is defined by a portion of a semiconductor substrate adjacent to the diaphragm, an air gap is formed between the electrodes, and a back acoustic cavity is formed adjacent to one of the electrodes and defined by a member which also shields the transducer from electromagnetic interference. Acoustic venting means is provided by an array of holes connecting the air gap to the back acoustic cavity. An acoustic port is defined by an element adjacent to the front acoustic cavity, with the size of the port being such as to produce a desired frequency response characteristic for the transducer.

BRIEF DESCRIPTION OF THE DRAWING

These and other features of the invention are delineated in detail in the following description. In the drawing.

It will be appreciated that for purposes of illustration, these figures are not necessarily drawn to scale.

DETAILED DESCRIPTION

Figure 1:
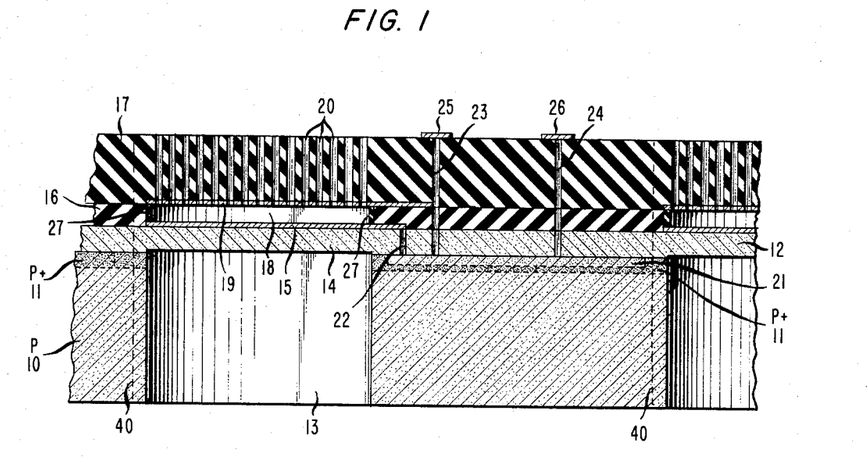
FIG. 1 is a cross-sectional view of a microphone in accordance with one embodiment of the invention.

Many of the basic features of the invention will be described with reference to the particular embodiment illustrated in FIG. 1. It will be appreciated that the Figure shows only a small portion of a semiconductor substrate which in this example includes a great many other identical, integrated, electronic transducer devices which are separated along saw lines, 40, following batch processing and testing.

The semiconductor substrate, 10, is a standard p-type silicon wafer having a thickness of approximately 300–600 $\mu$m (12–24 mils) and a <100> orientation. It will be appreciated that n-type wafers and other crystal orientations may be employed. A surface layer, 11, of p+ type is formed over at least portions of the substrate, for example, by an implantation of boron impurities to a depth of approximately 0.2 $\mu$m. The impurity concentration of this region is typically $5 \times 10^{+19}/cm^3$.

Formed over the semiconductor substrate is a monocrystalline silicon epitaxial layer, 12. An appropriate area of the semiconductor substrate is etched to form a front acoustic cavity, 13, so that the portion, 14, of the epitaxial layer over the cavity forms the vibrating diaphragm element of the microphone. The characteristics of the diaphragm are discussed in more detail below.

Formed on the surface of the diaphragm is a metal layer, 15, such as Ti-Au, which comprises one electrode of a capacitor. This layer is typically 0.1–0.5 $\mu$m thick. Formed over the epitaxial layer is a spacer layer, 16, which is typically polycrystalline silicon and can be formed by chemical vapor deposition. The thickness of the layer in this example is 0.60 $\mu$m and will generally be in the range 0.1 $\mu$m–4.0 $\mu$m. A backplate layer, 17, is formed on the spacer layer with a portion (hereinafter the backplate) over the area of the diaphragm to establish an air gap, 18. The backplate may comprise a layer of BN or $Si_3N_4$ but could be any insulating layer or layers. The thickness of the layer is approximately 12 $\mu$m and will generally be in the range 6 $\mu$m–30 $\mu$m. A metal or other conducting layer, 19, is formed on the surface of the backplate facing the air gap and comprises the second electrode of the capacitor. It can be the same material and thickness as the first electrode, 15.

Formed through the backplate and electrode, 19, to the air gap is a continuous array of holes, 20, for acoustic venting. This feature will be discussed in more detail below.

The electronics for driving the device may be fabricated in the adjacent area of the semiconductor substrate designated 21, and electrical contact to the electrodes may be provided through via holes, 22 and 23. Contact to the outside may be provided through via holes, 23 and 24, and contact pads, 25 and 26, formed on the surface of the backplate layer. If desired, additional via holes (not shown) could be provided from the electronics to the outside to establish separate dc supply, signal and ground leads.

In operation, a dc bias is applied to electrodes, 15 and 19, and an acoustic signal is made incident on diaphragm, 14, through the front acoustic cavity. The signal causes the diaphragm to vibrate, thus varying the spacing between the electrodes and the capacitance of the capacitor. This change in capacitance can be detected as a change in voltage across some load element, integrated into area, 21, such as a second capacitance and parallel resistance (not shown), and an electrical equivalent to the acoustic signal is produced. The array of holes, 20, permits escape of air in the gap, 18, so that air stiffness in the gap is not a significant factor in the diaphragm motion. Desirably, the amplitude of the output signal as a function of frequency will be as shown in curve B in FIG. 3, where the signal (at constant sound pressure amplitude) is essentially flat or falls no more than 3 dB over the portion of the audioband transmitted in telephone applications (0.3–3.5 KHz). In accordance with a feature of the invention, the vibrating diaphragm is essentially nontensioned so that the stiffness of the diaphragm is dominated by the mechanical bending moment. This can be contrasted with previous designs for integrated microphones where the diaphragm was a thinned portion of the semiconductor substrate and had a stiffness which was dominated by tensile stress resulting from a heavy boron impurity concentration.

Figure 4:
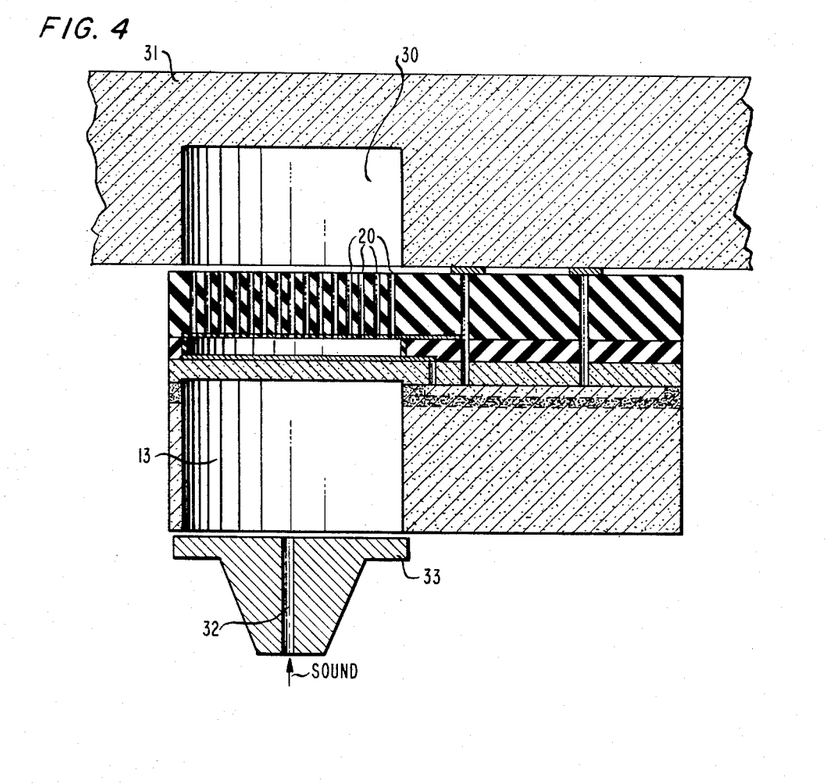
FIG. 4 is a cross-sectional view of a microphone in accordance with a further embodiment of the invention.

The advantage of using the nontensioned diaphragm results from the fact that the sensitivity (e) of the microphone depends upon the following parameters:

$$e \propto \left[ \frac{VA}{k_m + k_a} \right] / h_e \qquad (1)$$

where V is the dc bias voltage across the electrodes, A is the area of the diaphragm, $k_m$ is the effective mechanical lumped parameter (piston-like) stiffness of the diaphragm associated with the diaphragm's linearly averaged deflection, $k_a$ is the stiffness of the rear acoustic cavity (shown, for example, in FIG. 4), and $h_e$ is the distance between capacitor electrodes, linearly averaged over A, when the bias is applied to the electrodes. Thus, for the same sensitivity, the area, A, of the diaphragm may be reduced by decreasing the stiffness $k_m$ of the diaphragm ($k_a$ contributes less than ⅓ of the total stiffness acting on the diaphragm). We have found that when the stiffness is due primarily to tensile stress, a practical lower limit exists for reducing the membrane stiffness. In the present invention, however, $k_m$ is significantly lowered in order that the diaphragm area may be reduced by allowing the mechanical bending moment of the diaphragm to be the dominant mechanical stiffness component. Further, when the stiffness is due to the mechanical bending moment, the thickness of the diaphragm can be significantly increased over a tensioned membrane and still produce a significantly lower stiffness and diaphragm area.

It will be appreciated that effective stiffness $k_m$, as used in this application, is the stiffness of a piston-like model where the deflection of the piston is equal to the diaphragm deflection averaged over the area of the diaphragm. For a nontensioned diaphragm, this stiffness is given approximately by the relationship:

$$k_m \approx \frac{192\pi^2 D_p}{A} \qquad (2)$$

where $D_p$ is the flexural rigidity of the diaphragm.

In this example, the diaphragm thickness is 3.0 μm, the diaphragm is circular with a radius of 700 μm, $k_m$ and $k_a$ are approximately 625 and 175 N/m respectively. The biasing voltage across the electrodes is 1.3 volts. The resulting sensitivity is approximately −49 dB relative to 1 V/Pa at 400 Hz (excluding any signal voltage amplifiers that may be integrated on the chip microphone). For most nontensioned diaphragm applications, it is expected that the diaphragm thickness will range from 1 μm–5 μm, and area will range from 0.4 mm²–5 mm² to achieve proper sensitivity. Stiffness, $k_m$, of the nontensioned diaphragm is desirably less than 5500 N/m.

While in this example the diaphragm was formed from a single crystal epitaxial layer, 12, other types of nontensioned diaphragms might be employed. However, use of an epitaxial layer provides many advantages in terms of processing. For example, diaphragm thickness can be closely controlled by growing the layer over the boron-doped surface region, 11, and then utilizing an etchant which removes the semiconductor substrate but stops at the region, 11. The portion of region, 11, under the diaphragm can then be removed by applying an appropriate etchant such as KOH and H₂O for a predetermined period of time. As shown in FIG. 1, if desired, the etchant may be allowed to penetrate the epitaxial layer-substrate interface to achieve a desired diaphragm thickness less than the original epitaxial layer thickness. Close control of a nontensioned diaphragm's thickness, d, is important since $k_m \alpha d^{+3}$. This step may also be desirable to remove boron impurities which may have diffused into the epitaxial layer from the substrate and added tension to the layer. A further advantage is the fact that the epitaxial layer can be anisotropically etched to provide via holes (22, 23, 24) or other useful features.

It will be appreciated that, in this example, the epitaxial layer is essentially free of impurities so that there is essentially no tension component contributing to the stiffness of the diaphragm. However, it is contemplated that layers may be fabricated with some tension component, as alluded to above, and still produce advantageous results. The invention is therefore directed to "essentially nontensioned" diaphragms which are intended to include those having a bending stiffness contributing at least ⅔ of the total stiffness of the diaphragm. It is further contemplated that impurities may be intentionally introduced into the epitaxial layer to satisfy certain needs. For example, the introduction of phosphorus impurities into the layer could provide compression in the layer to counteract any tension that might be produced by the presence of boron impurities.

In accordance with another aspect of the invention, the acoustic venting means comprises a continuous array of small holes, 20, extending through the backplate and electrode, 19, which array extends over essentially the entire area of the backplate and electrode portion co-extensive with the diaphragm. Such an array permits a narrow distance between electrodes, 15 and 19, without overdamping, thereby permitting a reduction in the applied dc bias and in the area of the diaphragm.

Figure 2:
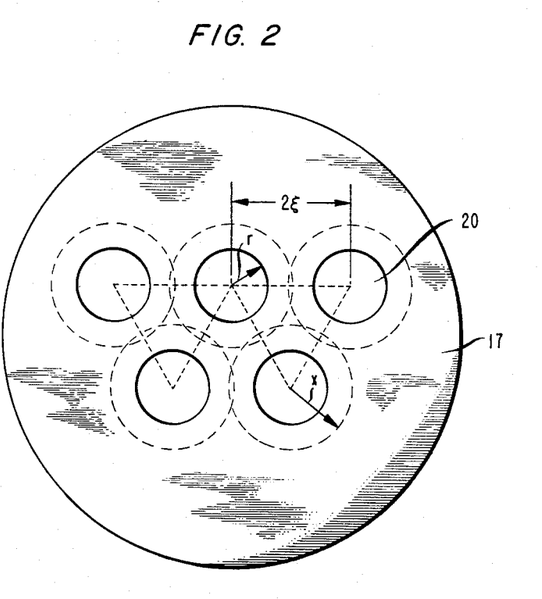
FIG. 2 is a top view of a portion of the device illustrated in FIG. 1.
Figure 3:
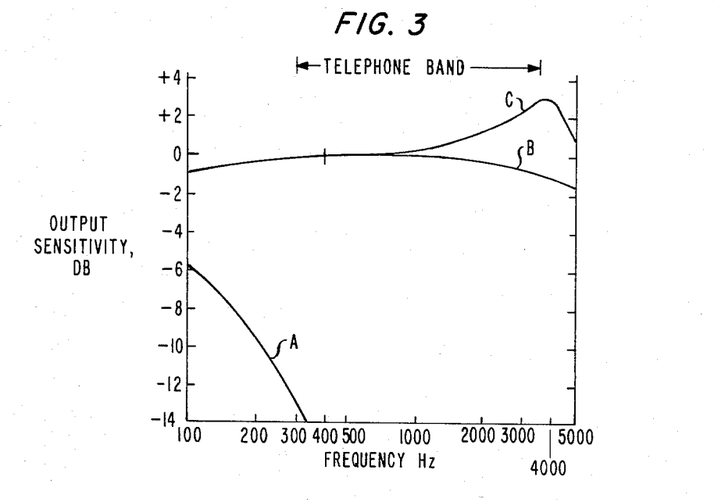
FIG. 3 is an illustration based on computer modeling of typical frequency response curves predicted for microphones fabricated in accordance with the invention as compared with predictions of a prior art type device where the reference level is the 400 Hz response level of curve B.

FIG. 2 is a top view of some of the holes in the array, which are greatly enlarged for illustrative purposes. It will be appreciated that essentially the entire area of the backplate is covered by these holes and consequently the array is considered to be continuous. The dynamic magnification factor, D, is defined in this application as the amount, in dB, that the frequency response rises in traversing the band from 400 Hz to the upper bound frequency of interest. For telephone applications where the upper bound frequency is 3500 Hz, it is desirable that D be greater than 31 3.0 dB. FIG. 3 shows a generally desirable, calculated, output characteristic (curve B) for telephony, which is achieved in this example in accordance with the invention. Returning to FIG. 2, such a characteristic can be achieved by a radius, r, of the holes and a center-to-center spacing of the holes, 2ξ, which satisfies the relationship:

$$D = -10 \log \left[ \left[ 1 - \left[ \frac{\omega}{\omega_n} \right]^2 \right]^2 + 4 \left[ \frac{\omega}{\omega_n} \frac{R_a}{R_c} \right]^2 \right] \qquad (3)$$

where D is the minimum desirable magnification factor, ω is the highest acoustic input frequency which will be transmitted expressed in radians (here, $2\pi \times 3.5$ KHz), $\omega_n$ is the natural radian frequency of vibration of the diaphragm ($\sqrt{K/M}$), K is the combined stiffness, $k_m + k_a$, of the diaphragm and back acoustic cavity, M is the effective lumped parameter mass of the diaphragm compatible with the prior definition of $k_m$ (which, for a nontensioned diaphragm is approximately 9/5 times the actual mass), $R_c$ is the critical damping level ($2M\omega_n$), and $R_a$ is the actual acoustic damping level of the air film in the air gap between electrodes. The acoustic damping is determined from the following:

$$R_a = \frac{NX^4 B \, 12\pi\eta}{h_e^3} \qquad (4)$$

where N is the number of holes, X is the local "radius-of-action" associated with each hole (i.e., the radius of the approximate circular area of air which will be vented through each hole (see FIG. 2), η is the coefficient of dynamic viscosity of air, and $h_e$ was defined following equation (1). B is given by the equation:

$$B = \frac{1}{4}\left[\ln\left(\frac{X}{r}\right)^2\right] - \frac{3}{8} + \frac{1}{2}\left(\frac{r}{X}\right)^2 - \frac{1}{8}\left(\frac{r}{X}\right)^4 \tag{5}$$

It will be further appreciated that the geometry of the array yields the following relationships:

$$X = \lambda \xi \tag{6}$$

$$N = \frac{A}{\pi X^2} \tag{7}$$

$$\nu = 1 - \frac{N\pi r^2}{A} \tag{8}$$

where $\lambda$ is determined by the hole configuration, A is the area of the backplate and electrode portion coextensive with the diaphragm area, N is the total number of holes, and $\nu$ is the fraction of the backplate or electrode, 19, which is not consumed by the holes. For the pattern in this example, where the center of each hole lies at the corner of an equilateral triangle, $\lambda = 1.05$. For other patterns of holes, the backplate area (A) can easily be expressed as a unique function of $\xi$ times N, thus determining X and $\lambda$ from equations 6 and 7 above. For a square array of holes, for example, $\lambda$ is 1.13. Also, if noncircular holes are used, the above relationships may still be used for first order calculations if the radius, r, is equated to $$\sqrt{\frac{A_h}{\pi}}$$

where $A_h$ is the area of the hole.

Thus, given the desired magnification factor D, the area, A, and mass of the diaphragm, M, the average distance between the electrodes when the bias is supplied, $h_e$, and the combined stiffness of the diaphragm and back acoustic cavity, K, the above equations can be solved to give combinations of hole radius and center-to-center spacing (r, $2\xi$) or hole radius and number (r, N) which can be utilized for acoustic venting in accordance with the invention. The preferred combination is that which consumes the minimum amount of electrode area. (For a detailed discussion of the derivation of relationships governing acoustic impedance of the air gap in electrostatic transducers due to holes in one of the electrodes, see Skvor, "On the Acoustical Resistance due to Viscous Losses in the Air Gap of Electrostatic Transducers," *Acustica*, Vol. 19, pp. 259–299 (1967-68), which is incorporated by reference herein.)

In this example, D is $-0.8$ dB, $h_e$ is 0.56 $\mu$m, N is approximately 2000, r is 9.8 $\mu$m and $2\xi$ is 29.8 $\mu$m for a diaphragm with area of $1.54 \times 10^{-6}$ m$^2$, and effective mass of $1.93 \times 10^{-8}$ kgm. This leaves a total area not consumed by holes of 61% ($\nu$) of the backplate or electrode area. The capacitance is still sufficient, however, to produce a sufficiently high output signal as specified by the sensitivity previously given.

Of course, the above parameters may be varied according to specific needs. It is recommended, however, that there be a minimum of at least 50 holes per square millimeter to avoid overdamping in the output signal and that each hole have a diameter of less than 100 $\mu$m to allow sufficient diaphragm capacitance (at least 1 pF) for operation of the transducer. For the sake of comparison, curve A of FIG. 3 shows the calculated frequency response for a hypothetical microphone having the same dimensions as described in the example shown by curve B, but not including the venting means of the invention. As compared with the microphone of curve B which includes 2000 holes (1300 holes/mm$^2$) each having a diameter of 19.6 $\mu$m, the microphone of curve A includes only 20 holes (13 holes/mm$^2$) each having a diameter of 196 $\mu$m. Both designs have the same electrode area not consumed by holes (61%) so that the capacitances are equal and at least the potential signal-to-noise ratio is the same for both. Nevertheless, curve A shows a severely overdamped frequency response.

It should be appreciated that the average spacing between electrodes ($h_e$) when a bias is supplied should not vary too much from the air gap (h) with no bias applied if the system is to remain stable. It is recommended, therefore, that $h_e$ be 4–10% less than h. In this example, $h_e = 0.94$ h.

As noted previously, a reduced air gap, which is possible with the venting means of the invention, should also permit a reduction in the external dc bias needed for operation. For a gap, h, between electrodes of less than 3.0 $\mu$m, it is expected that the microphone can be operated at less than 5 volts supplied to the capacitor electrodes.

It should also be appreciated that, although the air hole array is described with use of a nontensioned diaphragm, the hole array as described heretofore may also be used with tensioned diaphragms such as that shown in application of Busch-Vishniac, cited previously. In such cases, the area of the diaphragm may be larger than that for the nontensioned diaphragm, but would still be, advantageously, less than 8 mm$^2$.

It should be further appreciated that while the above relations allow one to specify a uniform air hole array (that is, a constant hole size and pattern), a somewhat nonuniform pattern that might possibly be desired may be designed by applying equation (4) piecewise across the backplate and electrode, and summing over N (holes).

The air gap, 18, electrode, 19, backplate layer, 17, and the air hole array, 20, may be conveniently formed by known deposition and photolithography steps. For example, layer 16, which may comprise polycrystalline silicon, can be deposited by chemical vapor deposition and the area which will comprise the air gap is then defined by selectively etching the layer. An etch-stop material, 27, such as BN or Si$_3$N$_4$ can be formed around the walls of the hole. The hole is then filled with a material such as polycrystalline silicon or SiO$_2$ and planarized. The electrode, 19, may then be formed by a selective deposition leaving the desired hole array therein. The backplate layer, 17, which may comprise BN or Si$_3$N$_4$ or a combination of like materials, is then deposited and the corresponding hole array formed therein by standard photolithography. The filler material can then be removed from the air cavity by applying another etchant through the hole array. Of course, during these various etching operations, the via holes, 22, 23 and 24, needed for interconnection can also be formed.

It will be appreciated that while the above example employed a circular diaphragm and backplate, the principles of the invention may be applied to any shaped diaphragm and backplate.

In accordance with a further aspect of the invention, various acoustical interconnection means and EMI shielding means may be incorporated into the basic microphone structure previously described. For example, FIG. 4 illustrates the formation of a back acoustic cavity, 30, adjacent to the air hole array, 20. This cavity is formed within a carrier substrate, 31, against which the silicon microphone structure is placed. This substrate can be a printed wiring board or other carrier substrate to which electronic components are usually attached.

Coupled to the front cavity, 13, is an acoustic port, 32, which is formed from an element, 33, which is typically a plastic closure. The acoustic port adds a degree-of-freedom to the microphone system and adds a peak to the frequency response of the device to serve various needs. Thus, in the present example, the response shown as curve C in FIG. 3, where the peak is placed near the upper end of the telephone band, is obtained from the microphone characterized by curve B simply by adding an acoustic port having a diameter of 150 μm and a length of 1600 μm. In this example, the cavity, 13, has a volume of 0.94 mm³. Long holes with narrow diameters yielding high acoustic mass are generally needed in this silicon microphone application due to the large stiffness of the small, front acoustic cavity. In general, diameters of 100–180 μm and lengths of 600–2000 μm are expected to be useful for producing peaks where desired. For telephone applications, it is desirable to form the peak within the frequency range 2.8–4.5 KHz. Although not illustrated in these figures, all members forming acoustic ports or cavities are acoustically sealed by standard means such as with adhesives or by clamping.

Figure 5:
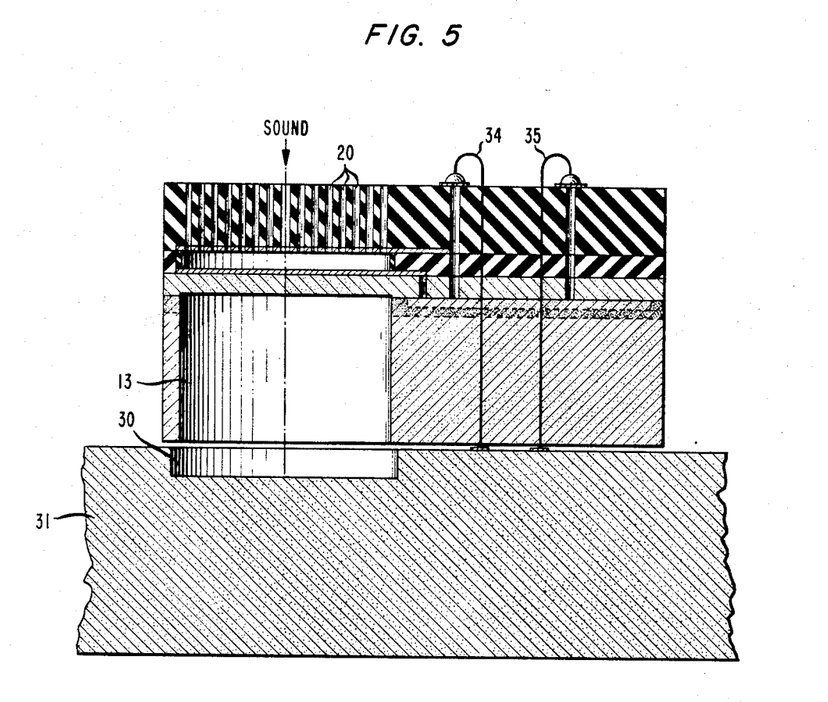
FIG. 5 is a cross-sectional view of a microphone in accordance with a still further embodiment of the invention.

If shaping of the frequency response, as shown in curve C, is not needed, the embodiment shown in FIG. 5 might be utilized. Here, the cavity, 30, formed in carrier substrate, 31, acts as an extension of front cavity, 13, and the acoustic signal is made incident on the diaphragm through the hole array, 20. In this embodiment, in fact, the cavity extension, 30, may be eliminated so that the acoustic cavity is formd entirely within the semiconductor substrate. In any event, no extra parts are needed to form the acoustic interconnections. A further advantage is that electrical contact can be made to the microphone by wire bonds, 34 and 35, from the carrier substrate, 31 to the top of the backplate layer.

Figure 6:
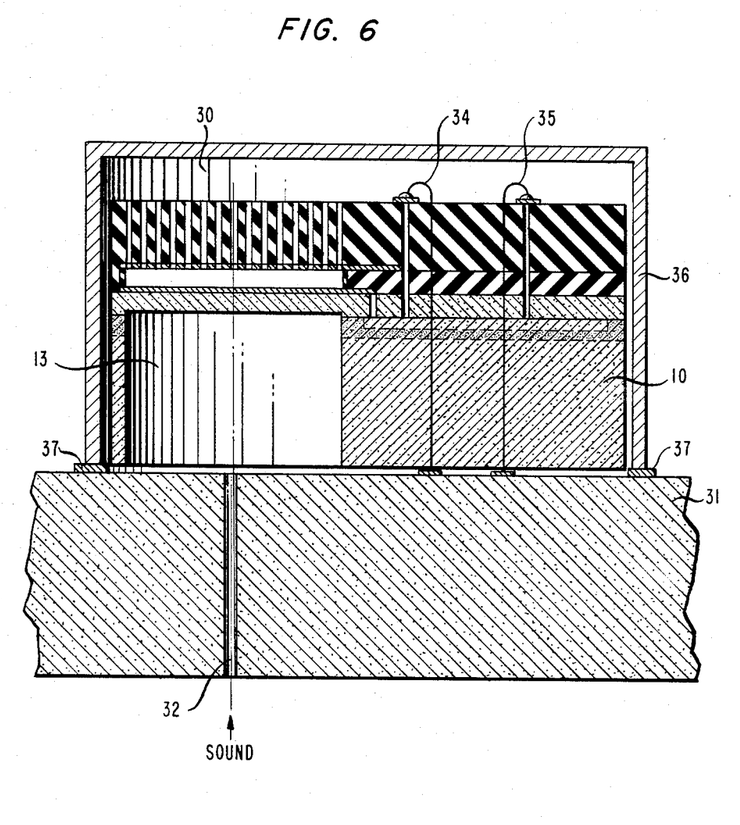
FIG. 6 is a cross-sectional view of a microphone in accordance with a still further embodiment of the invention.

In the embodiment illustrated in FIG. 6, sound is again incident on the diaphragm through an acoustic port, 32, coupled to the front cavity, 13. Here, however, the sound port is formed in the carrier substrate, 31, so that the microphone is again mounted with the backplate side-up permitting wire bonding. Additionally, an enclosure member, 36, is provided surrounding the entire semiconductor microphone. This member can be made of conductive or conductively plated plastic or metal so as to provide a shield for the device against electromagnetic interference. At the same time, the member forms a back acoustic cavity, 30, for the microphone. The member can be grounded, for example, by bonding to grounded pad, 37, formed on the carrier substrate. Thus, EMI shielding is provided with a minimum of piece-parts.

It should be appreciated that although the acoustical interconnection means and EMI shielding means are described with use of a nontensioned diaphragm, such may also be used with tensioned membranes as for example shown in application of Busch-Vishniac, cited previously.

It will be appreciated that the inventive features discussed herein could also apply to a pressure gradient type microphone where sound is allowed to strike both sides of the diaphragm, thus effecting a noise-canceling and directional response. To produce such a device in FIGS. 4 and 5, a secondary sound port would simply be placed in the carrier substrate, 31, while in the embodiment illustrated in FIG. 6 a small secondary port would be placed through enclosure member, 36. In any case, the second side of the diaphragm is accessed.

It will also be appreciated that although the above discussion has focused on the microphone, the principles of the invention may also be applicable to other types of electroacoustic transducers utilizing a capacitor whose capacitance varies in accordance with a vibrating diaphragm, whether an acoustic signal is converted to an electrical signal or vice-versa. For example, a loudspeaker or hearing aid receiver might be fabricated by applying a varying electrical signal to the capacitor electrodes (15 and 19) which causes vibration of the diaphragm (14) due to the varying deflection of the electrode (15) attached thereto. An acoustic output signal would therefore be produced. Thus, whichever way the energy conversion is taking place, the electric field between the electrodes varies in relationship with the vibrating diaphragm to permit conversion between electrical and acoustic signals.

It will also be realized that the invention is not limited to telephone band frequencies (0.3–3.5 KHz) but can be used in the full audio bandwidth (0.02–20 KHz). In fact, this silicon transducer invention can find application in the ultrasonic band (20–1000 KHz).

Various additional modifications will become apparent to those skilled in the art. All such variations which basically rely on the teachings through which the invention has advanced the art are properly considered within the spirit and scope of the invention.

What is claimed is:

1. An electroacoustic transducer formed within a semiconductor substrate comprising
    an essentially nontensioned diaphragm comprising a semiconductor material having a mechanical bending moment stiffness such that it vibrates in response to an input signal at audio and/or ultrasonic frequencies; and
    a pair of electrodes placed with respect to said diaphragm so that the electric field between the electrodes varies in relationship with the vibrating diaphragm to permit conversion between electrical and acoustic signals.

2. The device according to claim 1 wherein the transducer is a microphone and one of the electrodes is formed to vibrate with the diaphragm such that the capacitance varies in response to an acoustic signal incident on said diaphragm.

3. The device according to claim 2 wherein the diaphragm is a single crystalline epitaxial layer formed over the surface of a semiconductor substrate.

4. The device according to claim 3 wherein the thickness of the epitaxial layer is in the range 1–5 μm.

5. The device according to claim 2 wherein the area of the diaphragm is less than 5 mm².

6. The device according to claim 1 wherein the effective mechanical lumped parameter stiffness of the diaphragm, associated with the diaphragm's linearly averaged deflection, is less than 5500 N/m.

7. The device according to claim 3 wherein the epitaxial layer is formed over a surface layer in the substrate which has a higher impurity concentration than the bulk of the substrate.

8. The device according to claim 1 wherein an air gap is formed between the two electrodes and the device further comprises a continuous array of small holes extending through one of the electrodes to the air gap, said array covering essentially the entire area of that portion of the electrode which is co-extensive with the diaphragm.

9. The device according to claim 1 wherein the transducer is adapted for operation with a dc bias across the electrodes of less than 5 volts.

10. The device according to claim 1 wherein an air gap is formed between the electrodes and the device further comprises:
- a front acoustic cavity defined by a portion of the semiconductor substrate adjacent to the diaphragm;
- a rear acoustic cavity adjacent to one of the electrodes and defined by a member which also shields the transducer from electromagnetic interference;
- acoustic venting means comprising an array of holes connecting the air gap to the back acoustic cavity; and
- an acoustic port defined by an element adjacent to the front acoustic cavity, the size of the port being such as to produce a desired frequency characteristic for the transducer.

11. An electroacoustic transducer formed within a semiconductor substrate comprising:
- a diaphragm which vibrates in response to an input signal at audio and/or ultrasonic frequencies;
- a pair of electrodes placed with respect to said diaphragm so that the electric field between the electrodes varies in relation to the vibrating diaphragm to permit conversion between electrical and acoustic signals, the electrodes defining an air gap therebetween; and
- acoustic venting means comprising a continuous array of small holes extending through one of the electrodes to the air gap, said array covering essentially the entire area of that electrode which is co-extensive with the diaphragm, where the density of the holes in the array is at least 50 per mm$^2$ and the diameter of the holes is less than 100 μm.

12. The device according to claim 11 wherein the transducer is a microphone and one of the electrodes is formed to vibrate with the diaphragm such that the capacitance varies in response to an acoustic signal incident on said diaphragm.

13. The device according to claim 11 wherein a backplate layer is included adjacent to said one of the electrodes and said array of holes is included through the layer.

14. The device according to claim 11 wherein the spacing between electrodes is less than 3.0 μm when no dc bias is supplied to the electrodes.

15. The device according to claim 11 wherein the area of the diaphragm is less than 8 mm$^2$.

16. The device according to claim 1 wherein the spacing between the electrodes is uniform when no bias is supplied to the electrodes.

17. The device according to claim 11 wherein the transducer is adapted to operate with a dc bias across the electrodes of less than 5 volts.

18. The device according to claim 11 wherein the dynamic magnification factor of the output response of the transducer is greater than or equal to −3.0 dB.

19. The device according to claim 11 where the radius, r, center-to-center spacing, 2ξ, and number, N, of holes in the array satisfies the relationships:

$$D = -10 \log \left[ \left(1 - \left[\frac{\omega}{\omega_n}\right]^2\right)^2 + 4\left(\frac{\omega}{\omega_n} \frac{R_a}{R_c}\right)^2 \right]$$

$$R_a = \frac{NX^4 B \, 12\pi\eta}{h_e^3}$$

$$B = \frac{1}{4}\left[\ln\left(\frac{X}{r}\right)^2\right] - \frac{3}{8} + \frac{1}{2}\left(\frac{r}{X}\right)^2 - \frac{1}{8}\left(\frac{r}{X}\right)^4$$

$$X = \lambda \xi$$

and $$N = \frac{A}{\pi X^2}$$

where D is the minimum desirable dynamic magnification factor, ω is the highest radian frequency of the input signal to be transmitted, $\omega_n$ is the natural radian frequency of vibration of the diaphragm, $R_a$ is the damping level of the air in the gap, $R_c$ is the critical damping level, X is the local radius-of-action associated with each hole, $h_e$ is the average distance between the electrodes when the desired dc bias is supplied thereto, λ is a factor relating X and ξ for the geometry of the hole array, A is the area of the diaphragm, and η is the coefficient of dynamic viscosity of air.

20. The device according to claim 11 further comprising:
- a front acoustic cavity defined by a portion of a semiconductor substrate adjacent to the diaphragm;
- a back acoustic cavity adjacent to the air hole array and defined by a member which also shields the transducer from electromagnetic interference; and
- an acoustic port defined by an element adjacent to the front acoustic cavity, the size of the port being such as to produce a desired frequency response characteristic for the transducer.

21. The device according to claim 12 wherein the microphone is adapted to receive the acoustic signal through the hole array.

22. An electroacoustic transducer formed within a semiconductor substrate comprising:
- a diaphragm which vibrates in response to an input signal at audio and/or ultrasonic frequencies;
- a front acoustic cavity defined by a portion of the semiconductor substrate adjacent to the diaphragm;
- a pair of electrodes placed with respect to said diaphragm so that the electric field between the electrodes varies in relation with the vibrating diaphragm to permit conversion between electrical and acoustic signals and so that an air gap is formed between the electrodes;
- a back acoustic cavity adjacent to one of the electrodes and defined by a member which also shields the transducer from electromagnetic interference;

acoustic venting means comprising an array of holes connecting the air gap to the back acoustic cavity; and an acoustic port defined by an element adjacent to the front acoustic cavity, the size of the port being such as to produce a desired frequency response characteristic for the transducer.

23. The device according according to claim 22 wherein the transducer is a microphone and one of the electrodes is formed to vibrate with the diaphragm such that the capacitance varies in response to an acoustic signal incident on said diaphragm.

24. The device according to claim 22 wherein the acoustic port is defined in a carrier to which the semiconductor substrate is attached.

25. The device according to claim 22 wherein the back acoustic cavity is defined by a conductive member which covers the entire semiconductor substrate in which the integrated microphone is formed.

26. The device according to claim 22 wherein the diameter and length of the acoustic port is such as to produce a peak in the output response in the frequency range 2.8–4.5 KHz.

* * * * *